United States Patent
Fukui et al.

(10) Patent No.: US 7,048,862 B2
(45) Date of Patent: May 23, 2006

(54) FREE ATOM AQUEOUS SOLUTION PRODUCING APPARATUS, FREE-ATOM AQUEOUS SOLUTION PRODUCING METHOD, AND FREE-ATOM AQUEOUS SOLUTION

(75) Inventors: Kenji Fukui, Tokyo (JP); Hiroaki Kamiya, Aichi (JP)

(73) Assignee: Waterware Inc., Tokyo (JP)

( * ) Notice: Subject to any disclaimer, the term of this patent is extended or adjusted under 35 U.S.C. 154(b) by 362 days.

(21) Appl. No.: 10/470,683

(22) PCT Filed: Oct. 1, 2001

(86) PCT No.: PCT/JP01/08648

§ 371 (c)(1),
(2), (4) Date: Jul. 30, 2003

(87) PCT Pub. No.: WO02/062711

PCT Pub. Date: Aug. 15, 2002

(65) Prior Publication Data

US 2004/0065625 A1    Apr. 8, 2004

(30) Foreign Application Priority Data

Feb. 2, 2001  (JP) ............................ 2001-027482

(51) Int. Cl.
*B01D 17/06* (2006.01)
*B01D 35/06* (2006.01)
*B01D 24/00* (2006.01)
*B03C 1/00* (2006.01)
*A61L 2/00* (2006.01)

(52) U.S. Cl. ...................... 210/748; 210/695; 210/758; 210/222; 210/223; 210/263; 210/290; 210/660; 210/694; 422/22; 422/186; 422/186.01; 422/186.04; 250/432 R; 250/435

(58) Field of Classification Search ..................... None
See application file for complete search history.

(56) References Cited

U.S. PATENT DOCUMENTS 5,055,189 A * 10/1991 Ito .............................. 210/222
5,466,425 A * 11/1995 Adams ..................... 422/186.3
6,193,878 B1 * 2/2001 Morse et al. .................. 210/85
6,555,011 B1 * 4/2003 Tribelsky et al. ........... 210/748

FOREIGN PATENT DOCUMENTS

JP          63-4893 A         1/1988

(Continued)

*Primary Examiner*—W. L. Walker
*Assistant Examiner*—Krishnan S. Menon
(74) *Attorney, Agent, or Firm*—Sughrue Mion, PLLC

(57) ABSTRACT

A free radical solution producing apparatus, which comprises: a feed port (6) in which water is drawn, a dechlorination processing section (1) which produces first water by decomposing chlorine compounds in said water, a magnetic processing section (2) which produces second water by carrying out a process that applies a magnetic field to said first water, a radiation processing section (3) which produces third water by carrying out a process that irradiates a radiation to said second water, an ion exchange section (4) which produces fourth water by carrying out a process that performs an ion exchange for said third water, an electric field applying section (5) which produces fifth water by carrying out a process that applies a strong electric field to said fourth water, and a fifth water intake (7-5) from which said fifth water is obtained, produces water which has the effects of sterilizing and disinfection, and strong cleansing power.

16 Claims, 12 Drawing Sheets

FOREIGN PATENT DOCUMENTS

| | | |
|---|---|---|
| JP | 02-115094 A | 4/1990 |
| JP | 04-4090 A | 1/1992 |
| JP | 09-253632 A | 9/1997 |
| JP | 09-308888 A | 12/1997 |
| JP | 10-28974 A | 2/1998 |
| JP | 10-85747 A | 4/1998 |
| JP | 10-99864 A | 4/1998 |
| JP | 10-174980 A | 6/1998 |
| JP | 10-230265 A | 9/1998 |
| JP | 11-192479 A | 7/1999 |
| JP | 2000-574 A | 1/2000 |
| JP | 2000-5765 A | 1/2000 |

\* cited by examiner

Fig. 10

| SAMPLE | OXIDATION-REDUCTION POTENTIAL |
|---|---|
| ONLY FREE RADICAL SOLUTION (ADDING NO PURE OXYGEN) | 995mV |
| FREE RADICAL SOLUTION (ADDING PURE OXYGEN OF 5L/MIN) | 1003mV |
| FREE RADICAL SOLUTION (ADDING PURE OXYGEN OF 10L/MIN) | 1009mV |
| FREE RADICAL SOLUTION (ADDING PURE OXYGEN OF 15L/MIN) | 1014mV |
| CITY WATER (BEFORE REMOVING CHLORIDE) | 523mV |
| CITY WATER (AFTER REMOVING CHLORIDE) | 253mV |

Fig. 11

| | TYPE OF WATER | OXIDATION-REDUCTION POTENTIAL | pH |
|---|---|---|---|
| 1 | FREE RADICAL SOLUTION | 0.98~1.04V | 6 |
| 2 | STRONG ACID WATER | 1.0~1.4V | 2.2~2.7 |
| 3 | OXIDATION REDUCTION WATER | -0.6~-1.3V | 11~12.5 |
| 4 | STRONG ACID WATER WITH HYDROCHLORIC ACID | APPROX.0.8V | 6 |
| 5 | STERILIZING SPRAY | 0.9~1.0V | 5~7 |
| 6 | SANITARY STERILIZING WATER | 0.74V | 7.5~8.5 |
| 7 | ELECTROLYTIC HYPO-AQUEOUS WATER | ~0.8V | 8.0 |

Fig. 12

| | DILUTED STAGE | QUANTITY OF INOCULATED GERMS (CFU) | NUMBER OF GERMS DETECTED | | | | | |
|---|---|---|---|---|---|---|---|---|
| | | | $t_A$=1 MIN. | 2 MIN. | 3 MIN. | 5 MIN. | 10 MIN. |
| FREE RADICAL SOLUTION | $10^{-1}$ | $1.42 \times 10^7$ | $3.7 \times 10^4$ | $3.1 \times 10^4$ | $3.6 \times 10^4$ | $2.8 \times 10^4$ | $2.4 \times 10^4$ |
| | $10^{-2}$ | $1.42 \times 10^6$ | 0 | 0 | 0 | 0 | 0 |
| | $10^{-3}$ | $1.42 \times 10^5$ | 0 | 0 | 0 | 0 | 0 |
| CHLORHEXIDINE | $10^{-1}$ | $1.42 \times 10^7$ | 0 | 0 | 0 | 0 | 0 |
| PHYSIOLOGICAL SALINE SOLUTION | $10^{-1}$ | | $1.07 \times 10^5$ | $1.34 \times 10^5$ | $1.47 \times 10^5$ | $1.47 \times 10^5$ | $0.97 \times 10^5$ |

Fig. 13

| | DILUTED STAGE | QUANTITY OF INOCULATED GERMS (CFU) | NUMBER OF GERMS DETECTED | | | | | |
|---|---|---|---|---|---|---|---|---|
| | | | $t_A$=1 MIN. | 2 MIN. | 3 MIN. | 5 MIN. | 10 MIN. |
| FREE RADICAL SOLUTION | $10^{-1}$ | $8.5 \times 10^6$ | $3.2 \times 10^4$ | $3.3 \times 10^4$ | $3.1 \times 10^4$ | $5.1 \times 10^4$ | $3.6 \times 10^4$ |
| | $10^{-2}$ | $8.5 \times 10^5$ | 0 | 0 | 0 | 0 | 0 |
| | $10^{-3}$ | $8.5 \times 10^4$ | 0 | 0 | 0 | 0 | 0 |
| CHLORHEXIDINE | $10^{-1}$ | $8.5 \times 10^6$ | 0 | 0 | 0 | 0 | 0 |
| PHYSIOLOGICAL SALINE SOLUTION | $10^{-1}$ | $8.5 \times 10^6$ | $4.2 \times 10^4$ | $4.6 \times 10^4$ | $4.6 \times 10^4$ | $3.7 \times 10^4$ | $5.1 \times 10^4$ |

FREE ATOM AQUEOUS SOLUTION PRODUCING APPARATUS, FREE-ATOM AQUEOUS SOLUTION PRODUCING METHOD, AND FREE-ATOM AQUEOUS SOLUTION

BACKGROUND OF THE INVENTION

1. Technical Field

The present invention relates to the production apparatus for functional water, the producing method of the functional water and the functional water produced by the method.

2. Background Art

There are various types of "water", depending on their properties and producing method, and they are produced by various methods and used based on their respective characteristics and functions. Some of the main types include normal drinking water, industrial water, pure water and functional water.

The pure water is a type of water where its purity has been enhanced by removing as many impurities as possible from the water. Such water is produced by removing dissolved salts, organic substances, fine particles, fungi, dissolved gas and ions by using filters, degassing and ion exchange processes. The pure water are mainly used for various washing solutions in semiconductor fabricating processes, solvents for chemicals, circulatory water at nuclear power plants, cleansing and manufacturing solutions for preparing pharmaceutical products, compounding a medicine and medical surgery at hospitals.

The functional water is water whose characteristics have been altered by applying various processes mainly to normal drinking water. The methods include a magnetic process, an electrical process, a materials adding process and a materials removing process from the water. The pure water may be a type of functional water produced through the materials removing process.

An example by the electrical process is alkali ion water. Alkali ion water is alkaline electrolysis water obtained from the negative electrode side when tap water is electrolyzed after the water is pre-processed. The water contains a large amount of $OH^-$ ion while its pH is about 10.

It is the that this water has the effect of enhancing bioactivity of living matter by promoting the absorption of calcium or activating bacteria in the intestines of living beings.

An example by the magnetic process is magnetic process water. FIGS. 1A and 1B show a schematic diagram of its producing process. The magnetic processing apparatus includes a magnetic processing tube 101, and magnets 102 and 103. After the water is pre-processed through the filtering and chlorine removing process, it is fed into the magnetic processing tube 101. The magnetic processing tube 101 has two magnets 102 and 103 aligned in parallel. The water is processed magnetically when it passes through a space between the two magnets. It is reported that plants nurtured with such magnetic process water grow faster than plants raised with normal water, and that concrete made with magnetic process water shows enhanced strength.

An example by the materials adding process is mineral added water. That is the water with an increased volume of magnesium and calcium ions. The processing method involves a running water through a filter containing coral sand (a type of coral: Its main ingredient is calcium carbonate) to have the water absorb the mineral. It is the that mineral is a necessary ingredient for living matters. It also has the effect of making water tastier.

SUMMARY OF THE INVENTION

Therefore, the object of the present invention is to provide a producing apparatus and a producing method for water or aqueous solution having sterilizing and disinfecting properties.

Another object of the present invention is to provide a producing apparatus and a producing method for water or aqueous solution having strong cleansing power for machine facilities.

Still another object of the present invention is to provide a producing apparatus and a producing method for water or aqueous solution containing abundant amounts of active hydrogen.

Yet still another object of the present invention is to provide a producing apparatus and a producing method for water or aqueous solution that works effectively in raising living things.

It is also an object of the present invention that is to provide a producing apparatus and a producing method for water or aqueous solution that is effective in enhancing the resuscitative powers of living matters.

Therefore, in order to achieve an aspect of the present invention, the present invention provides a free radical solution producing apparatus including: a feed port; a dechlorination processing section; a magnetic processing section; a radiation processing section; an ion exchange section; an electric field applying section and a fifth water intake. In the feed port, water is drawn. The dechlorination processing section produces first water by decomposing chlorine compounds in the water. The magnetic processing section produces second water by carrying out a process that applies a magnetic field to the first water. The radiation processing section produces third water by carrying out a process that irradiates a radiation to the second water. The ion exchange section produces fourth water by carrying out a process that performs an ion exchange for the third water. The electric field applying section produces fifth water by carrying out a process that applies a strong electric field to the fourth water. From the fifth water intake, the fifth water is obtained.

In order to achieve another aspect of the present invention, the present invention provides a free radical solution producing apparatus including: a feed port; a dechlorination processing section; a magnetic processing section; a radiation processing section; an ion exchange section; an electric field applying section; an oxygen adding section and a sixth water intake. In the feed port, water is drawn. The dechlorination processing section produces first water by decomposing chlorine compounds in the water. The magnetic processing section produces second water by carrying out a process that applies a magnetic field to the first water. The radiation processing section produces third water by carrying out a process that irradiates a radiation to the second water. The ion exchange section produces fourth water by carrying out a process that performs an ion exchange for the third water. The electric field applying section produces fifth water by carrying out a process that applies a strong electric field to the fourth water. The oxygen adding section which produces sixth water by carrying out a process that adds oxygen to the fifth water. From the sixth water intake, the sixth water is obtained.

In the free radical solution producing apparatus of the present invention, the magnetic processing section includes: a magnetic processing tube and a plurality of pairs of magnets. In the magnetic processing tube, the first water flows. The plurality of pairs of magnets is mutually located apart, with different types of magnetic poles facing each other and toward the magnetic processing tube.

In the free radical solution producing apparatus of the present invention, the radiation processing section includes: a mineral ore ceramic layer and a ceramics container. The mineral ore ceramic layer includes materials including radioactive materials such that the radiation is efficiently irradiated to the second water passing through the radiation processing section. The ceramics container retains the mineral ore ceramic layer.

In the free radical solution producing apparatus of the present invention, the radiation processing section has the mineral ore ceramic layer. The mineral ore ceramic layer further includes materials including far infrared radiation materials such that a far infrared radiation is efficiently irradiated to the second water passing through the radiation processing section.

In the free radical solution producing apparatus of the present invention, the electric field applying section includes an electrical discharge section which carries out corona discharge in the fourth water.

In the free radical solution producing apparatus of the present invention, the oxygen adding section includes: a bubbling generator which adds oxygen as sort of bubbles to the fifth water in the fifth water.

In order to achieve still another aspect of the present invention, the present invention provides a free radical solution producing method including the steps of: producing first water by decomposing chlorine compounds in water; producing second water by carrying out a process that applies a magnetic field to the first water; producing third water by carrying out a process that irradiates a radiation to the second water; producing fourth water by carrying out a process that performs an ion exchange for the third water; and producing fifth water by carrying out a process that applies a strong electric field to the fourth water.

The free radical solution producing method of the present invention, further includes the step of: producing sixth water by carrying out a process that adds oxygen to the fifth water.

In the free radical solution producing method of the present invention, the step of producing the second water includes: applying magnetic fields with different directions alternately to the first water.

In the free radical solution producing method of the present invention, the step of producing a third water includes: irradiating the radiation and far infrared radiation to the second water at the same time by mineral ore with grain diameter of less than 2 mm.

In the free radical solution producing method of the present invention, the step of producing a fifth water includes: carrying out corona discharge in the fourth water.

In a free radical solution of the present invention produced by using the free radical solution producing apparatus described above, an oxidation-reduction potential is equal to or greater than 980 mV.

In the free radical solution of the present invention, the pH is approximately 6.

In conjunction of the above description, following related arts are disclosed.

A producing method and the apparatus for sterilizing solution is disclosed into Japanese Laid Open Patent Application (JP-A 10-99864). The object of this invention is to provide sterilizing solution continuously.

The apparatus for sterilizing solution includes (i) at least one ion exchange water softener; (ii) a saturated salt solution tank; and (iii) at least one electrolysis cell which includes a working chamber and supporting chamber that are separated by porous membrane, wherein one of the chambers includes an anode, the other includes a cathode. When it is used, (iv) supplying water to at least one ion exchange water softener for making soft water; (v) flowing first part of the soft water to the saturated salt solution tank to make a saturated salt solution by dissolving salt into the soft water; (vi) mixing second part of the soft water with a first waste matter derived from the saturated salt solution tank at predetermined rate to make a mixture of the soft water and the saturated salt solution; (vii) passing the mixture through the working chamber and the supporting chamber in at least one of the electrolysis cell; and (viii) passing a second waste matter derived from the saturated salt solution tank through at least one of the ion exchange water softener; wherein the waste matter from the working chamber of at least one of the electrolysis includes the sterilizing solution. The produced sterilizing solution has pH of 4.0 to 7.0, and oxidation-reduction potential of 800 to 1300 mV.

In the electrolysis cell, the mixture, which contains the salt, is electrolyzed. So, the mixture should contain the salt for the electrolyzation.

A water quality improving method and a water quality improving apparatus is disclosed into Japanese Laid Open Patent Application (JP-A-Heisei 10-174980). The object of this invention is to provide the water quality improving method and its apparatus which provide an effect of improving a water quality and further maintain the effect of improving the water quality over a long period of time, in order to produce appropriate water for cocking.

The water quality improving apparatus includes a vessel, discharge electrodes and a filter layer. The vessel stores the water processed. The discharge electrodes are electrodes for high voltage generator arranged in the vessel and includes a cathode an anode. The cathode is arranged above the water processed. The anode, which faces the cathode, is arranged in the water processed. The filter layer is added in the vessel. The discharge electrodes of high voltage generator may be discharge electrodes for corona discharge. The filter layer may include at least ores containing natural minerals and be arranged inlet side or outlet side of the container.

In this art, there is no description regarding sterilizing or cleansing power of the water processed by the water quality improving apparatus. The water supplied to this apparatus is city water, according to the specifications (description), containing chlorine because of chlorine sterilization. It is supposed that the chlorine should be contained in the water supplied to the apparatus for the electrolyzation.

A weak acid soften water producing apparatus and a weak acid soften water producing method is disclosed into Japanese Laid Open Patent Application (JP-A 10-230265). The object of this invention is to provide an apparatus and a method which can easily generate weak acid soften water and alkaline water that are widely used in homes by one apparatus.

The weak acid soften water producing apparatus generates weak acid soften water from city water. It includes a cation exchange resin bath and an electrolysis bath. The cation exchange resin bath removes hard elements including Ca ion and Mg ion from supplied city water. The electrolysis bath changes the property of the supplied city water into weak acidity by electrolyzation.

In the electrolysis bath, the supplied city water, which contains chlorine (for chlorine sterilization) and does not contain cation (removed by the cation exchange resin bath), is electrolyzed. So, it is supposed that the chlorine should be contained in the supplied water for the electrolyzation.

A batch type strong electrolysis water producing apparatus is disclosed into Japanese Laid Open Patent Application (JP-A 10-85747). The object of this invention is to stabilize the properties of high conductive water in the storage tank, raw water flowing into the storage tank is made as constant as possible by installing a raw water stabilizing member.

The batch type strong electrolysis water producing apparatus is to generate strong acid electrolysis water of pH 2.0 to 3.0 by electrolyzing high conductive water. The high conductive water is the water increasing its conductivity by adding salt to raw water. The electrolyzation is carried out by applying direct current between the cathode and the anode in the high conductive water in a electrolysis tank. The electrolysis tank is divided into an anode section and a cathode section by a ion permeability membrane, where the anode is in the anode section and the cathode is in the cathode section. The high conductive water is stored in another tank included in the apparatus. The high conductive water is supplied to the electrolysis tank through a water level sensor and an exciting open type electromagnetic valve. The electrolysis water generated is outputted to outlet water receiving tank which is included in the apparatus. The raw water is supplied to the other tank through stabilizing member. The stabilizing member may be ion exchange resin.

In the electrolysis tank, the high conductive water, which contains salt, is electrolyzed. So, it is supposed that the salt should be contained in the water supplied to the tank for the electrolyzation.

A water processor is disclosed into Japanese Laid Open Patent Application (JP-A-Heisei 9-253632). The object of this invention is to provide the water processor including a new type filter of hollow fiber membranes with superior filtration performance and a filtration bath with effective magnetic processing function, which enable to obtain great volume of delicious water by purifying and activating the city water.

The water processor includes a prefilter and a filtration bath. The prefilter includes a plurality of hollow fiber membranes of which the water permeation coefficient is equal to or more than 3000 L/m3·hr·kg/cm2 in a container. It is an external pressure type filter of which at least one end is bundled and fixed by using potting material, and can be carried out backwashing. In the prefilter, at least one hollow fiber type filter of which the hollow fibers have hydrophilic property is installed. The prefilter includes at least two housing unit connected in series, which has at least one of sets of more than one flow channel. The filtration bath includes a tubular housing with an inlet and an outlet for water in each end, in which particulate activated carbon, sand and the like are respectively deposited in a shape of layers. Also, in each of upper and lower sections of the layer of which particulate ceramics are deposited in the tubular housing, at least one of magnets is arranged such that directions of magnetic field lines coincide with each other, and direct along the water flow. After the raw water is filtered by the prefilter, the water processor filters and activated the filtered liquid by the filtration bath.

A removing fine particles from ultra pure water apparatus is disclosed into Japanese Laid Open Patent Application (JP-A-Showa 63-4893). The object of this invention is to remove fine particles from ultra pure water at a final stage of producing ultra pure water.

The removing fine particles from ultra pure water apparatus charges fine particles electrically in the water by a voltage supplying means, wherein the water is obtained by carrying out preprocess to raw water, that includes a reverse osmosis membrane process, an ion exchange process, an ultraviolet sterilizing process, a high-performance ion exchange process and an ultrafilter membrane process. Next, the apparatus introduces the water into a bath to which the strong electric field or magnetic field is applied, divides the water including many fine particles and the water including few fine particles, and send the water including few fine particles to the water using process.

The method of processing city water is disclosed into Japanese Laid Open Patent Application (JP-A-Heisei 2-115094). The object of this invention is to obtain the water which is tasty, odorless and hard to decay in spite of store for a long time by activating the city water.

The method of processing the city water includes two steps of: radiating magnetic field lines to the city water by attaching source of magnetic field at a branch piping drawn into a building from a main piping of the city water; and introducing the city water into a container having ceramics so as to contact the city water to the ceramics.

The gas dissolving water producing apparatus is disclosed into Japanese Laid Open Patent Application (JP-A-Heisei 4-4090). The object of this invention is to provide the apparatus which produces the water dissolving gas of high concentration.

The gas dissolving water producing apparatus includes a membrane type deaerator and a membrane type gas adding equipment. The membrane type deaerator is installed at the upstream of the gas dissolving water supply line for supplying the gas dissolving water continuously. The membrane type gas adding equipment is installed at the downstream.

A magnetic water processing apparatus and an assemble method of the same are disclosed into Japanese Laid Open Patent Application (JP-A-Heisei 9-308888). The object of this invention is to provide the apparatus of which the magnetic effect increases more effectively than before by converging magnetic field lines (magnetic flux) inside to concentrate the magnetic field lines (the magnetic flux) into a line in which water flows. And, it can be easy to assemble the apparatus without depending on the magnetic flux of magnets by treating a plurality of permanent magnets equipped as a unit.

The magnetic water processing apparatus placed in a piping includes a tube, at least a pair of magnets and a yoke part. The tube is connected as a part of the piping through which water flows. The pair of magnets has two magnets which sandwich the tube between, face each other and have polarities different from each other. The yoke part is covered with the magnets.

An ozone water producing apparatus is disclosed into Japanese Laid Open Patent Application (JP-A-Heisei 10-28974). The object of this invention is to provide the ozone water producing apparatus which dissolves ozone form ozone generator effectively into water.

The ozone water producing apparatus includes a bubbler and an ozone dissolving section. The bubbler introduces the ozone gas to the water to make micro bubbles. The ozone dissolving section dissolves the ozone through staying mixture of the water and the micro bubbles obtained by the bubbler in the water.

A water activating method is disclosed into Japanese Laid Open Patent Application (JP-A 2000-5765). The object of this invention is to provide the new water activating method which can facilitate gelatinization of rice in cooking rice.

The water activating method includes the step of radiating far infrared radiation after magnetizing the water by applying the magnetic field. The magnetic field may be 3000 to 5000 gauss. The peak wavelength of the far infrared radiation may be in the range of 4 to 40 µm. The clearance between magnets for the water passing through in the magnetic field may be 1.5 to 5 mm, and the flow velocity of the water may be 1.0 to 3.0 m/sec.

A water property improving apparatus and an using method of the same is disclosed into Japanese Laid Open Patent Application (JP-A 11-192479). The object of this invention is to provide the water property improving apparatus and the using method of the same which can generate processed water having strong cleansing power by activating molecular motion and generating cations and anions to remove contamination.

The water property improving apparatus includes any one of tourmaline ore, tourmaline ore molding, ceramics radiating far infrared ray, ceramics radiating radiation and magnets or any combination of thereof in a vessel as a water property improving materials. The water passes through the vessel, which has an inlet and an outlet, such that the water contacts with the water property improving materials.

A fluid magnetic processing apparatus is disclosed into Japanese Laid Open Patent Application (JP-A 2000-574). The object of this invention is to process fluid by exposing in the magnetic field line.

The fluid magnetic processing apparatus is to carry out the magnetic process to fluid flowing in the lines by exposing in the magnetic field. It includes a magnetic unit having a yoke of which one side is arranged at the permanent magnet and another side is arranged at an effective part touched to the line. The plurality of the magnetic unit is arranged such that the magnetic poles appeared at the effective parts are arranged N and S alternately along the flow of the fluid.

BRIEF DESCRIPTION OF THE DRAWINGS

FIG. 10 is a table showing the oxidation-reduction potential of the free radical solution of the present invention;

FIG. 11 is a table showing the pH of the free radical solution of the present invention and the functional water produced by conventional technology;

FIG. 12 is a table showing the results of sterilization effect tests on colon *bacillus* 0157:H7 in the free radical solution of the present invention; and FIG. 13 is a table showing the results of sterilization effect tests on methicillin-resistant *staphylococcus* in the free radical solution of the present invention.

DETAILED DESCRIPTION OF THE INVENTION

Figures 1A, 1B:
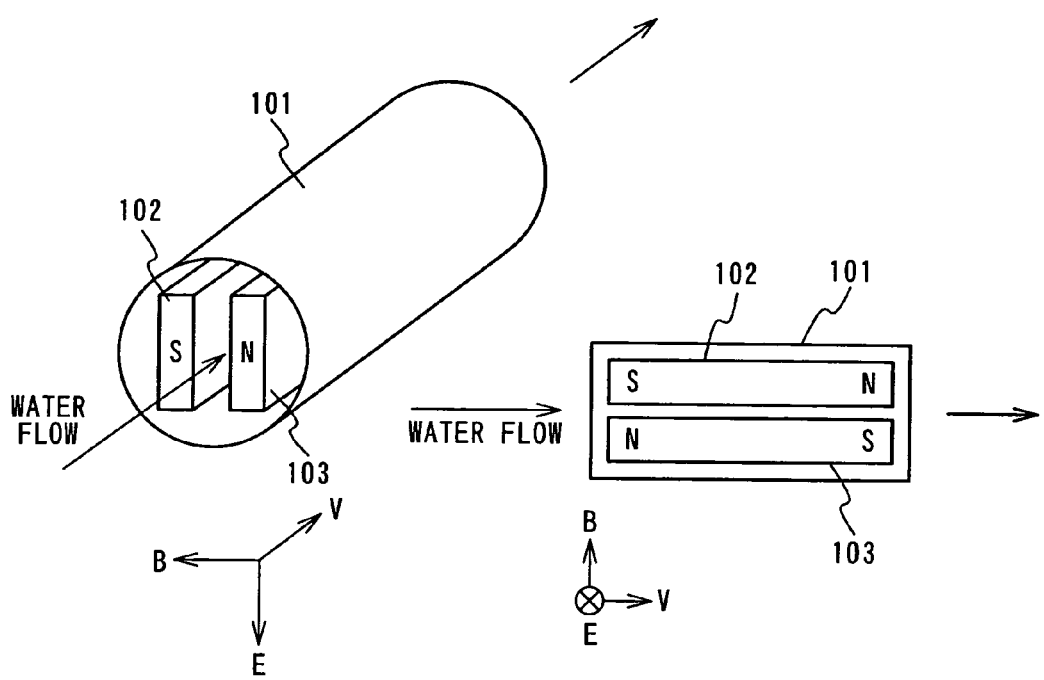
FIGS. 1A and 1B are configuration diagrams showing an example of a conventional magnetic process water producing apparatus.

Best Mode for Carrying Out the Invention

The embodiments of a free radical solution producing apparatus according to the present invention will be described with reference to the attached drawings.

The free radical solution producing apparatus of the present invention is a producing system for "Free radical solution", a type of water that differs from conventional water in that it brings out the surface activation effect (cleansing power), the active oxygen effect (sterilizing power) and the active hydrogen effect (resuscitating power) of the water by separating and isolating the atomic elements of oxygen and hydrogen in the water in a state close to the natural environment.

Firstly, the Free radical solution will be explained.

In the natural world, there are various types of functional water that possess strong cleansing, sterilizing or resuscitating powers. It is believed that the functional water is created by undergoing the following five stages in the process of their formation in the natural world.

The First Stage: Rainwater contains a considerable amount of impurities and organic materials collected from the atmosphere or the soil. This water rains on the ground and penetrates the ground surface. In that process, water is filtered by natural soil, and absorbs mineral from the soil to become mineral water.

The Second Stage: Water stored deep beneath the earth's surface as mineral water becomes subject to atomic isolation by such minerals such as iron ores in the ground and the magnetic force from terrestrial magnetism. Then, the atoms are activated to contain radicals, active hydrogen and the like.

The Third Stage: The isolation and activation of atoms in activated water is promoted by radiation and far infrared ray (far infrared radiation) that exist in nature and natural rocks that contain radioactive elements in the ground, and the water comes to contain a considerable amount of active hydrogen and radicals. Moreover, the water will absorb more minerals to become natural water containing large amounts of active hydrogen and mineral.

The Fourth Stage: Natural water containing large amounts of active hydrogen and minerals flows up to the surface from the depths of the earth. At this time, the filtering operation by the soil adjusts the minerals, making some water rich in mineral and other water with lesser amounts of minerals.

The Fifth Stage: Water that gushes up to the earth's surface become natural water with some possessing strong cleansing power or sterilizing power by absorbing ozone from the atmosphere, while some water will possess resuscitating power through its active hydrogen ingredients.

Therefore, it is considered that the five stages described above, in principle, are desirably executed continuously and totally in the order described above to produce "functional water" of the natural world. Therefore, if these five stages are created artificially, allowing one to produce functional water that processed through these stages, it can be assumed that extremely functional waters can be created. This type of water is called "Free Radical Solution" (hereinafter, it is also referred as "the Solution"). The Solution is called solution because it differs in terms of ingredient and state (the amount of ingredients such as active hydrogen, and the respective molecules are in a monomer state) from normal water. Because such water is created by going through the above five natural stage processes, they are believed to be functional water produced by an extremely ecological method.

The invention of the free radical solution producing apparatus is a system for producing the Solution (the free radical solution) by artificially creating the five stages described above and continuously executing the entire process in that described order. It is possible to produce water with strong cleansing power, sterilizing and resuscitating power with this apparatus.

Moreover, by adding the sixth process of adding oxygen to the Solution processed through the above five stages, the oxygen movement within the Solution is activated. This added step will further enhance the water's cleansing, sterilizing or resuscitating power.

The Embodiment 1

Next, the configuration of the first embodiment of the free radical solution producing apparatus according to the present invention will be described in detail with reference to FIGS. 2 to 7.

Figure 2:
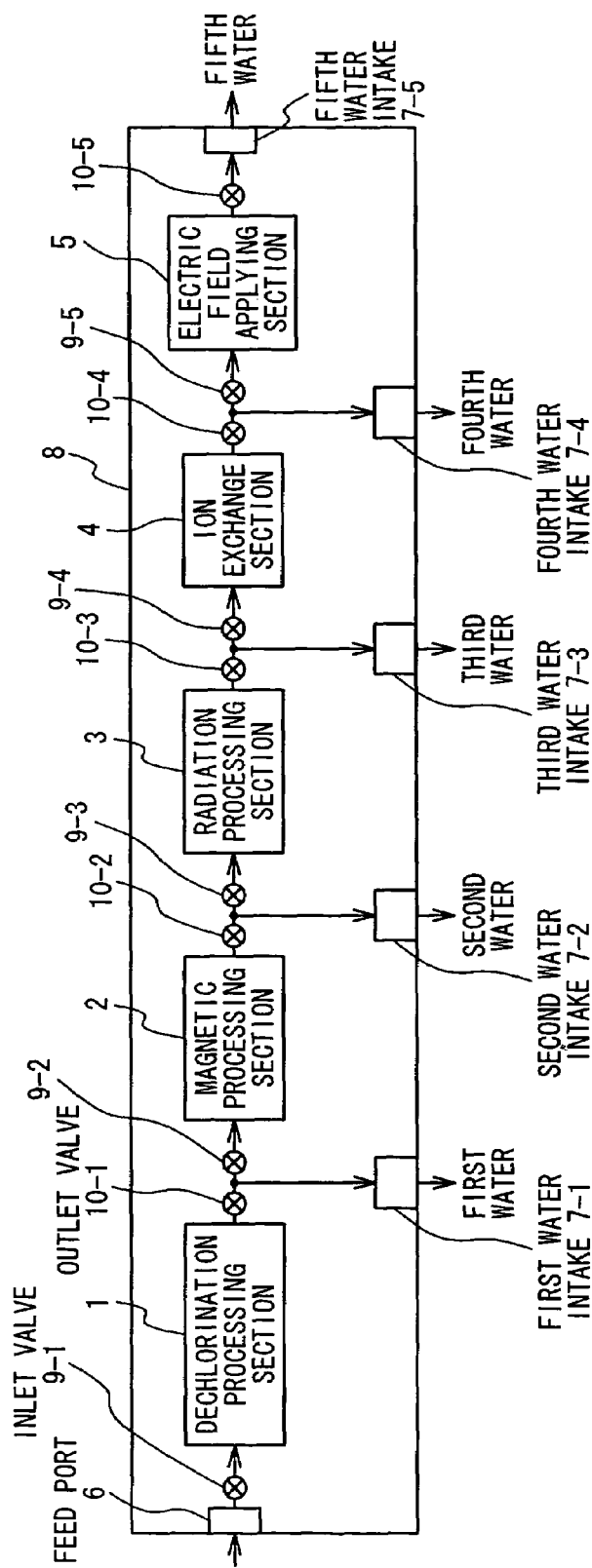
FIG. 2 is a configuration diagram showing the first embodiment of the free radical solution producing apparatus of the present invention.

FIG. 2 is a configuration diagram showing the first embodiment of the free radical solution producing apparatus of the present invention. The free radical solution producing apparatus 8 includes a dechlorination processing section 1, a magnetic processing section 2, a radiation processing section 3, an ion exchange section 4, an electric field applying section 5, a feed port 6, first to fifth water intakes 7-1 to 7-5, inlet valves 9-1 to 9-5, and outlet valves 10-1 to 10-5.

Figure 3:
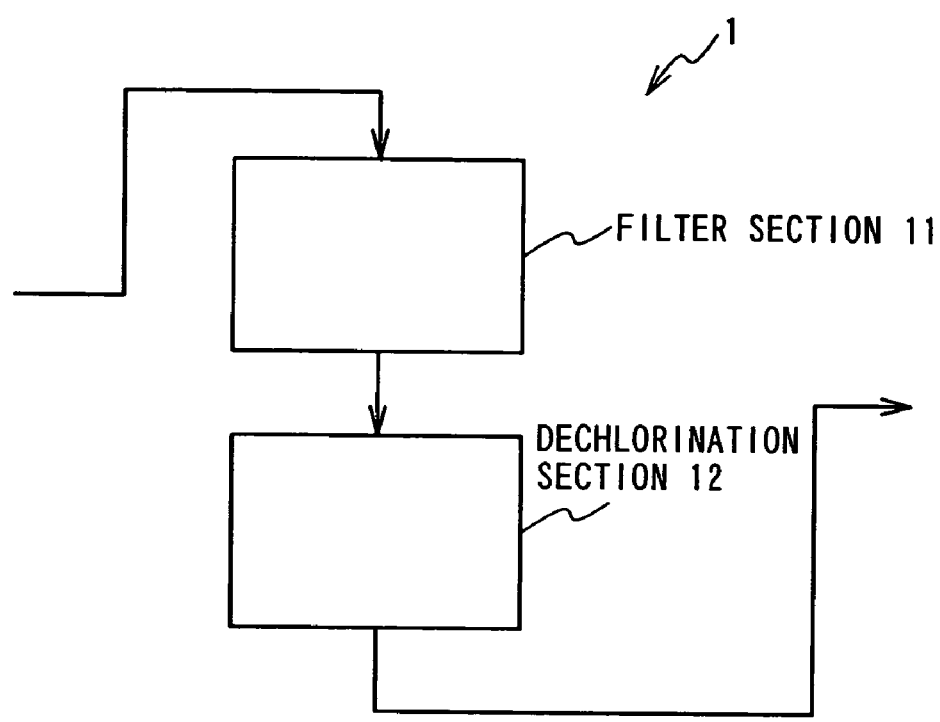
FIG. 3 is a configuration diagram showing the dechlorination processing section in the free radical solution producing apparatus of the present invention.

Water such as city water is drawn into the apparatus through feed port 6, the dechlorination process (1)—the magnetic process (2)—the radiation process (3)—the ion exchange process (4)—the electric field application process (5) are implemented in this order, and the product is taken out as the Solution from the fifth water intake 7-5. The dechlorination processing section 1 is connected by pipe to the feed port 6 through the inlet valve 9-1. And, as shown in FIG. 3, it includes the dechlorination section 12 and filter section 11 that are connected each other by a pipe.

The filter section 11 is connected to the pipe from the feed port 6 (explained later) and the pipe to the dechlorination section 12. It is filled with filter material made of unwoven fabric, and is designed to remove relatively large particles such as iron rust from the water. The dechlorination section 12 is filled with calcium sulfite, or pellets (spherical shaped pellets of 2.5 mm diameter) containing calcium sulfite. The calcium sulfite is used to remove the chloride compounds through the reduction process in the water passing through filter 11.

Filters with the equivalent chlorine removal capability of calcium sulfite may be used to perform this function. These filters include active carbon filters, and hollow filters. Here, the chlorine removal capability means to eliminate chlorine molecules from the water.

Figure 4A:
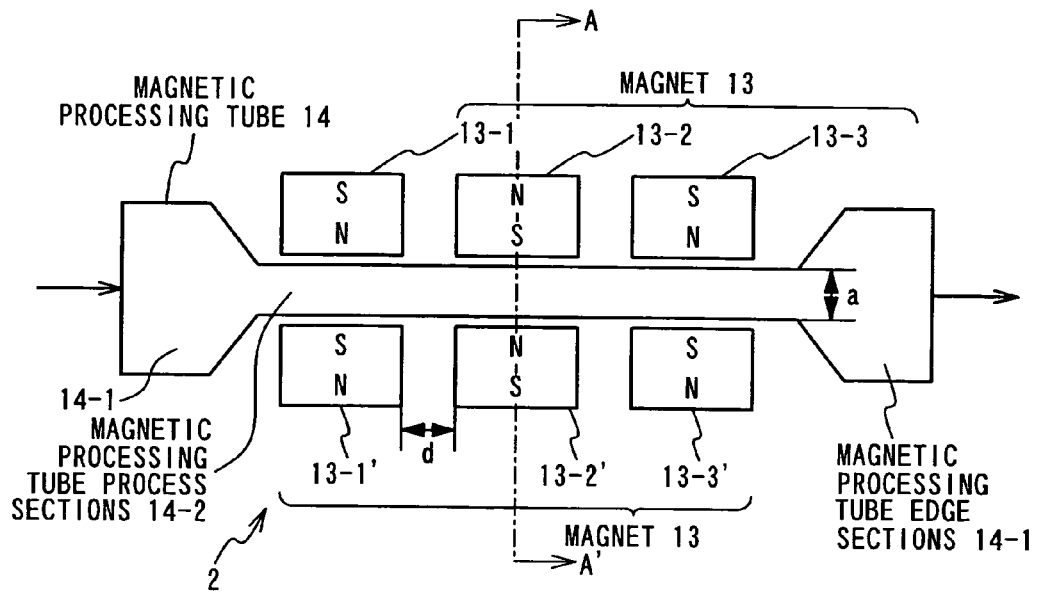
FIG. 4A is a configuration diagram showing the magnetic processing section in the free radical solution producing apparatus of the present invention.

The magnetic processing section 2 is connected by pipe to the dechlorination processing section 1 through the outlet valve 10-1 and inlet valve 9-2. As shown in FIG. 4A, it includes the magnets 13 and the magnetic processing tube 14, and magnetically processes the water when water is passed through the magnetic processing tube 14. The magnetic processing tube 14 includes the magnetic processing tube edge sections 14-1 that connect to pipes and the magnetic processing tube process sections 14-2.

Figure 4B:
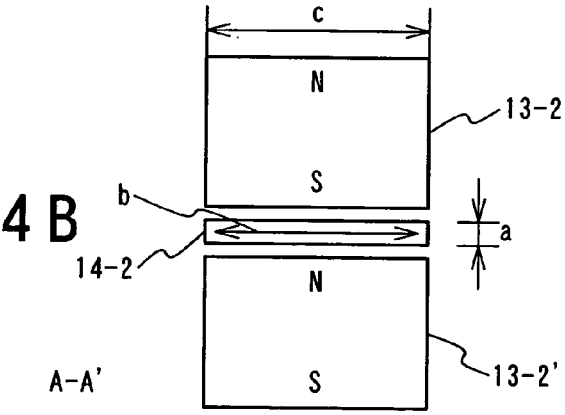
FIG. 4B is a configuration diagram showing a cross section of the magnetic processing section in the free radical solution producing apparatus of the present invention.
Figure 4C:
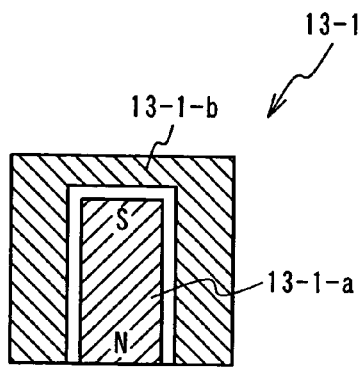
FIG. 4C is a configuration diagram showing a cross section of the magnet in the magnetic processing section in the free radical solution producing apparatus of the present invention.

The magnet 13 (13-1 to 13-3, 13-1' to 13-3') shows a magnetic force of 12,000 gauss per each magnet. The cross section of the magnet 13-1 is shown in FIG. 4C as the cross section representing all magnets 13. Magnet 13-1 includes the permanent magnet 13-1-$a$ and the core 13-1-$b$. Core 13-1-$b$ has the effect of strengthening the directionality of the magnetic field of magnets 13. The magnet 13-1-$a$ side is iron and its outer side is lead in a two-layered structure. The magnets 13 are positioned on both sides of the magnetic processing tube process section 14-2 (for example, 13-1 and 13-1'), with three magnets each for a total of six arranged along the direction of the water flow in the tube. The magnets 13 facing each other and sandwiching the magnetic processing tube process section 14-2 (for example, 13-2 and 13-2'), or the adjacent magnets 13 (for example 13-1 and 13-2) direct their respective opposing magnetic poles to the magnetic processing tube process section 14-2.

While the magnets 13 in FIG. 4A are permanent magnets, it is permissible to use electromagnets. In this case, even a low magnetic field would have significant results by applying alternating magnetic fields while maintaining the magnetic field application condition of "having magnets 13 that face each other sandwiching the magnetic process tube process section 14-2, or the adjacent magnets 13 would respectively direct their opposing magnetic poles against the magnetic process tube, process section 14-2."

As shown in FIG. 4A, the magnetic processing tube 14 has the magnetic processing tube edge sections 14-1 that is enlarged because it connects to another pipe, but the magnetic processing tube process sections 14-2 is thinner. Its cross section is the size of $a \times b$, as shown in FIG. 4B. The $a$ is thinner to allow water flowing through the magnetic processing tube process sections 14-2 to receive the effect of the magnetic field as strong as possible. The b is about the same width or shorter than the horizontal width c of magnets 13 (the width of the magnet in the vertical direction from the direction of the water flow), preferably shorter than c. This is to have the magnetic field from the magnets 13 to be applied uniformly to the water in the tube. The distance d between adjacent magnets 13 (for example, the distance between 13-1 and 13-2) may be zero, basically, but preferably about the same as a, and the magnet 13 is placed a slight distance away from the adjacent magnet 13. This is to restrain the effects of adjacent magnet 13 (for example 13-1 against 13-2) on the magnetic field created between the opposing magnetic poles of magnets 13 (for example, 13-2 and 13-2') that face each other while sandwiching the magnetic processing tube process sections 14-2. However, the magnets are not placed too far apart because this could cause the area where magnetic field cannot be applied on water to expand.

In this first embodiment, the distances are $a=3$ mm, $b=2$ cm, $c=2$ cm and $d=3$ mm. Also, the length of the magnet of the magnetic processing tube process sections 14-2 is 20 cm. The tube is made of non-magnetic material (for example, austenitic stainless steel, aluminium or resin). In this embodiment, the interior is the austenite stainless steel SUS304 while aluminum alloy is used for the exterior. Also, in accordance with the volume of water to be processed, it is possible to arrange more than one set of magnets 13 and magnetic process tube 14 in parallel, up and down or left and right, but in a way that the arrangement fulfils the above-mentioned magnetic field application conditions.

The radiation processing section 3 is the area where water is processed by radiation and the like. The intake side is connected by pipe to the magnetic process section 2 through the outlet valve 10-2 and the inlet valve 9-3.

Figure 5:
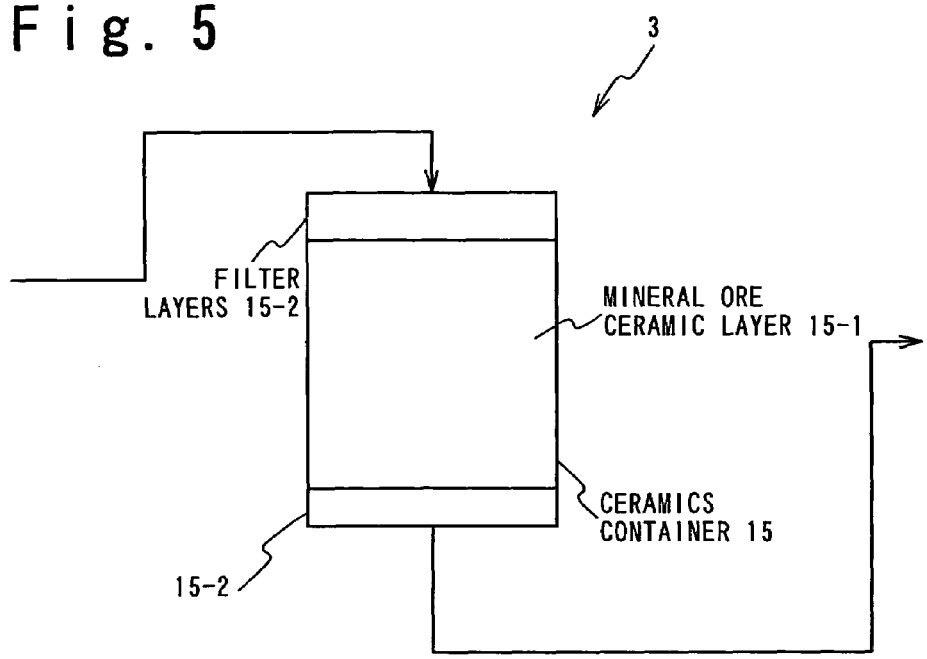
FIG. 5 is a configuration diagram showing the radiation processing section in the free radical solution producing apparatus of the present invention.

As shown in FIG. 5, the filter layers 15-2 containing filter materials are at the inlet and outlet sides of the ceramics container 15, while a mineral ore ceramic layer 15-1 containing a mix of three types of pulverized materials, which are natural ores emitting radiation, natural ores and sintered ceramics emitting far infrared rays, exists between them.

The filter layer 15-2 on the inlet and outlet sides use such as unwoven fabric and filter paper as filters, here, in this embodiment, an unwoven polyester fabric is used. The filter is for preventing the respective materials from flowing out from the mineral ore ceramic layer 15-1. Also, it is used for uniformly spreading incoming water to the entire cross section of the radiation processing section 3 in the water flow direction and the vertical direction. The mineral ore ceramic layer 15-1 uses natural ores containing natural thorium uranium (in this embodiment, zircon is used) for the radiation processing and natural ores that radiates far infrared rays (in this embodiment tourmaline is used) for far infrared ray processing. Also, alumina and silica are used for sintered ceramic. The ratio of the natural ores containing radioactive materials and far infrared ray irradiating material and the sintered ceramic is approximately 3:3:4.

The mineral ore ceramic layer 15-1 must radiate radiation and far infrared rays to water as efficiently as possible. For this, the following use of the respective ores is conceivable. (1) Sintered substances to be porous materials after pulverizing the ore once into fine powder. To make it porous, it is necessary to loosely mold the pulverized material. Or, to mix a pore former (a type of organic material) in the pulverized material and then to mold and sinter it (creates pores in the sintered material when the organic material burns off and generates $CO_2$). (2) Fine particles by finely pulverized. The particle diameter is less than 5 mm, or preferably less than 2 mm.

In the case of (1), the porous ores will have a remarkably broader surface area than normal ores of about the same shape. Therefore, when water flows through the fine holes of the porous ores, the water comes in contact with the ores with excellent efficiency. That is, water will enjoy the benefit of a stronger effect from radiation and far infrared rays.

In the case of (2), the aggregation of fine particle ores will have a remarkably larger surface area than normal ores with the same cubic volume of the aggregated ores. Therefore, when water flows through the aggregation of fine particle ores, water comes in contact with the ores with greater efficiency. Therefore, water will be able to enjoy the benefit of stronger effect from the radiation and far infrared rays.

Also, what is common to both (1) and (2) is that when water permeates the mineral ore ceramic layer 15-1, impurities in the water can be removed because of the filtering and adsorption effect of the layer.

However, the processing speed of water would decrease conspicuously if water is passed through narrow space (holes of porous substances, between the particles of a aggregation of fine particles) because the flow volume of water will be limited. Therefore, in this embodiment, the following materials are used in consideration of the processing speed of water, while using the technologies described in (1) and (2). As for natural mineral ores containing radioactive materials, ores pulverized into particles with diameters of up to 4 mm are used. As for natural mineral ores that radiate far infrared rays, a porous materials with grain diameter of about 4 mm is used after the ores are finely pulverized and sintered.

And the ceramics container 15 is filled with ceramic with grain diameter of about 4 mm together with the ores in order to retain these mineral ores. The reason the grain diameter of the respective ores and the ceramic are set at the same level is to assure that the container is uniformly filled with the materials.

With this approach, it is possible to efficiently irradiate radiation and far infrared rays to water while maintaining a reasonable water processing speed.

If the ceramics container 15 is sufficiently large, or the volume of the water to be processed is small, it is possible to fully use the technologies described in (1) and (2). That is, in the case of (1), a single porous substance is used to occupy the entire ceramics container 15. In the case of (2), ores pulverized into extremely fine powder are used. While the process volume of water might decline, it raises the efficiency in radiating the water with radiation and far infrared rays. Also, by using extremely fine particle porous substance, it is possible to produce an exponential effect in (1) and (2).

Incidentally, the density of radiation of the radioactive substance contained in the radiation processing section 3 is less than 370 Becquerel/g at the raw material stage. And, the dose equivalent of radiation which the apparatus operator is exposed to in one year is adjusted to be less than 1 mSv. The radioactive substance is contained such that it will not flow out of the filter layer 15-2. Also, the entire radiation processing section 3 is made into a container that can be easily loaded or unloaded. The old container can be easily replaced with a new one.

Figure 6:
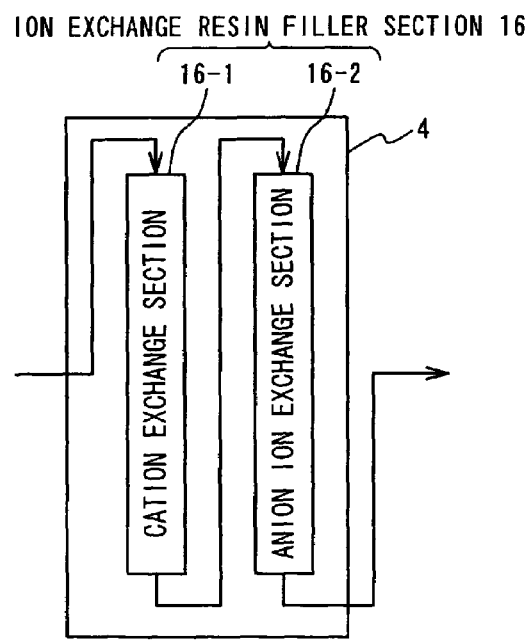
FIG. 6 is a configuration diagram showing the ion exchange section in the free radical solution producing apparatus of the present invention.

The ion exchange section 4 has its feed port side connected by pipe to the radiation processing section 3 through the outlet valve 10-3 and the inlet valve 9-4. As shown in FIG. 6, it includes an ion exchange resin filler section 16 (cation exchange section 16-1 and anion ion exchange section 16-2) which is connected by pipes. This section is used to remove cation impurities ($Na^+$, $Ca^{3+}$, etc.) and anion impurities ($Cl^-$, $F^-$, etc.). The respective sections are filled with cation exchange resins and anion exchange resins. The method and means, such as shape of the resin and membrane type of the resin, do not matter here as long as the above effects can be obtained.

The electric field applying section 5 is connected by pipe to the ion exchange section 4 at its feed port side, and connected to the fifth water inlet 7-5 at the outlet side.

Figure 7:
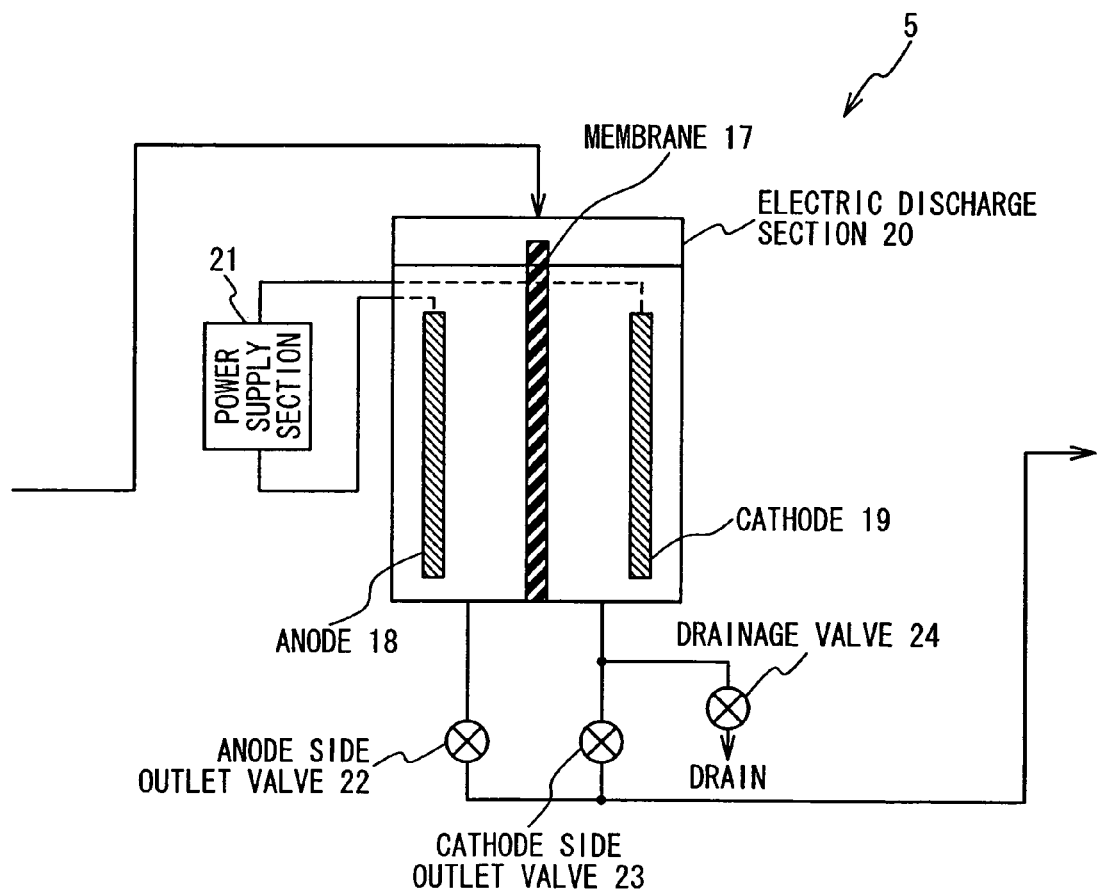
FIG. 7 is a configuration diagram showing the electric field applying section in the free radical solution producing apparatus of the present invention.

As shown in FIG. 7, the electrical field applying section 5 includes the electric discharge section 20, the power supply section 21, the anode side outlet valve 22, the cathode side outlet valve 23 and drainage valve 24. The electric discharge section 20 includes the membrane 17, the anode 18 and the cathode 19. Water is poured into the section with the membrane 17 in the center and the anode 18 and cathode 19 on the left and the right of the membrane 17. The electric discharge is carried out in the water. The membrane 17 is there to restrain the mutual dispersion of whatever is formed on the electrodes. In this embodiment a high polymer fluorine-type resin is used. The anode 18 and the cathode 19 are electrodes for applying electrical fields to the water inside. Both electrodes are placed parallel in the form of thin rods to facilitate corona discharge. Moreover, comb shaped electrodes arranged in parallel, or an arrangement of one electrode in cylindrical form and the other in rod form placed on the center line of the cylinder may also be used. In this embodiment example, a titanium-plated chrome-alloy is used.

The power supply section 21 is a power unit for applying an electrical field on anode 18 and cathode 19, with both electrodes connected by conductive wire. While direct, high voltage current is normally applied on the electrodes, the power supply is exchangeable. Thus, an alternating current voltage can also be applied.

The feed port 6 is an inlet valve to draw in water from city water source located outside of the apparatus. It is possible to attach various types of couplings to facilitate pipe connections. The first water intake 7-1 is a valve to take out water (hereafter referred to as the First Water) processed by the dechlorination processing section 1. The second water intake 7-2 is a valve to take out water (hereafter referred to as the Second Water) processed by the magnetic processing section 2. The third water intake 7-3 is a valve to take out water (hereafter referred to as the Third Water) processed by the radiation processing section 3. The fourth water intake 7-4 is a valve to take out water (hereafter referred to as Fourth Water) processed by the ion exchange section 4. The fifth water intake 7-5 is a valve to take out water (hereafter referred to as Fifth Water) processed by the electric field applying section 5. The feed port and outlets of these sections are operated either manually or automatically (electromagnet valve, etc.)

The inlet valve 9-1 and the outlet valve 10-1 are the valves for the dechlorination processing section 1. The inlet valve 9-2 and the outlet valve 10-2 are the valves for the magnetic processing section 2. The inlet valve 9-3 and the outlet valve 10-3 are the valves for the radiation processing section 3. The inlet valve 9-4 and the outlet valve 10-4 are the valves for the ion exchange section 4. The inlet valve 9-5 and the outlet valve 10-5 are the valves for the electric field applying section 5. These inlet and outlet valves are operated either manually or automatically (with electromagnet valves etc).

Next, the operations of the first embodiment of the free radical solution producing apparatus of the present invention will be described below in detail with reference to FIGS. 2 to 7.

In FIG. 2, a city water line is connected to the feed port 6 as the water source. When producing the Solution, it is necessary to open the correct the inlet valves, the outlet valves and water intake by considering which of the First Water to the Fifth Water are necessary. In this embodiment, the Fifth Water shall be collected. Next, the feed port 6 is opened to draw in the water.

The water first enters the dechlorination processing section 1. As shown in FIG. 3, the water enters the filter section 11 and then goes to the dechlorination section 12 after relatively large particles are removed. The city water contains chlorine for sterilization purpose. The chlorine added to the water exists in a dissolved state of equilibrium with hypochlorous acid and hydrogen chloride. In the dechlorination section 12, the appropriate amount of pellets containing calcium sulfite are dissolved into the water in accordance with the water flow, dissolving the hypochlorous acid and chlorine to produce chlorine ions. Chlorine ions are removed by the ion exchange section 4 in the later stages.

However, when using a filter with the capability to remove chlorine at the same amount as calcium sulfite, the filter promotes the ionization of chlorine by adsorbing and removing the chlorine in the water.

The water (the First Water), from which impurities are removed at this stage, it still contains chlorine ions and minerals. From the micro standpoint, water molecules form clusters $((H_2O)_n)$. The water molecules dynamically and randomly change while repeating the process of coupling and separating. While they exist mostly in the form of cluster, they are believed to be in the form of a pentamer where oxygen atoms in the water molecules are positioned in the pinnacle and the center of gravity of a regular tetrahedron.

The water (the First Water) from dechlorination processing section 1 enters the magnetic processing section 2.

As shown in FIGS. 4A to 4C, the flat-shaped magnetic process tube 14 has a flat space with a high magnetic field applied (24,000 gauss×3 sets=72,000 gauss). When the water (the First Water) passes through this space, it alternately receives inverse magnetic forces, one in the upward direction and the other in the downward direction, depending on the arrangements of the magnets 13. As water molecules with polarized electric charges are affected by electromagnetic induction effect of the magnetic force, it is anticipated that the collision frequency and the collision energy of water molecules clashing will increase. As a result, it is believed that the clusters will disintegrate and the microscopic polarization of the density of water molecules will decrease. Also, since the hydrogen atoms in the water molecules dynamically and randomly change while repeating the process of coupling and separating from surrounding oxygen atoms, it is believed that some of that random change will be severed midway and the water molecules themselves will be disintegrated by the impact of electromagnetic induction effect.

In the water (the Second Water) at this stage, water molecules is monomers by applying the strong magnetic force, at the same time it is anticipated that some of them are active hydrogen ($OH^-$, $H^+$,.H).

The water (the Second Water) exiting from the magnetic process section 2 flows into the radiation processing section 3.

As shown in FIG. 5, the water spreads through the filter layer 15-2 as it is filtered, and reaches the side surfaces of the container. And, in the mineral ceramic layer 15-1 that contains considerable amount of zircon that irradiates radiation and tourmaline that irradiates far infrared rays, the water is irradiated by radiation and far infrared rays. As a result, it is believed that the water turns into water containing large amounts of short-lived active species and radicals such as active hydrogen. The following reactions are considered to occur within the water. Water is ionized into $H_2O^+$ and $e^-$ (electron) due to the photoelectric effect or the Compton effect caused by radiation. The $e^-$ reacts with water molecule and becomes e-aq (hydrated electron). As for some of the $H_2O^+$, $H_2O^+$ reacts with water molecule and becomes $H_3O^+$ and .OH (radical). And the e-aq and .OH react to become .OH (active hydrogen). As for others of the $H_2O^+$, $H_2O^+$ returns to $H_2O$, while generating fluorescent light.

When ionizing water molecules by radiating radiation, it is normally believed that high output energy is required because of the surface tension caused by the clusters of water molecules. However, using the present invention, it is believed that the molecules of the water (the Second Water) at this stage become monomolecules or radicals. Thus, even if substance with low radioactivity is used, a strong effect can be anticipated. The respective mineral ores have large surface areas and come in contact with water efficiently. This fact also is believed to lead to a strong effect.

Also, the filter layer and the layer containing various natural mineral ores and ceramics function as a filter to reduce the impurities in the water.

In the water (the third Water) at this stage, some of the monomolecules are believed to become ionized and then become short-lived active species and radicals including active hydrogen by radiation. The percentage of these such as short-lived active species is expected to increase compared with those of the Second Water.

If it is necessary to take out the water (the Third Water) flowing out from the radiation processing section 3, the water is taken out through the third water intake 7-3. It is believed that the water at this stage contains large amounts of short-lived active species and radicals that include active hydrogen. Moreover, because minerals have not been removed, it is believed that it has become water that is effective in enhancing the resuscitative powers of living matter. That is, such water is believed to be effective in nurturing living things.

The water (the third water) from the radiation processing section 3 enters the ion exchange section 4.

As shown in FIG. 6, cations from materials such as minerals are removed through the cation exchange resin of the cation exchange section 16-1. Next, the anions such as chlorides are removed by the anion exchange resin of the anion exchange section 16-2. It is believed that this method is more effective than the displacement operation by the normal ion exchange because the activation of the respective impurities at this stage increases due to the magnetic field and radiation.

In the water (the Fourth Water) at this stage, impurities such as Mg, Ca, Na, Zn, Fe, Cu, Cl and F are removed through ion exchange. Moreover, this water is believed to contain large amounts of short-lived active species such as active hydrogen or radicals, and be composed of monomers of water molecules.

While this water does not contain mineral, it has large amounts of short-lived active species, such as active hydrogen, and radicals, and is composed of monomers of water molecules, which are easily absorbed by living things, and are considered to have resuscitative power. It is believed to be effective in nurturing living things.

The water (the Fourth Water) from the ion exchange section 4 enters the electric field applying section 5.

As shown in FIG. 7, high voltage is applied to the water at the electric discharge section 20 of the electric field applying section 5. The high voltage is applied between the anode 18 and the cathode 19 in the water. And, the water processed by the anode 18 is collected as the Solution (the Fifth Water).

The Fourth Water at the stage, in which the only active species are such as $OH^-$, $H^+$, .H (active hydrogen), are assumed to be in a state of electrically-charged pure water, without containing any mineral impurities. By applying a corona discharge at this stage, it is believed that oxidized water $H_2O_2$ is formed through the ozone effect caused by high voltage and high electrical field. Some will become OH, and are believed to become $H_2O_2$ by combining with OH that exists in the Fourth Water. Others are believed to form active oxygen.

As the Fourth Water is considered to be composed of monomers of water molecules containing large amounts of radicals and short-lived active species such as active hydrogen, it is believed that the effect of corona discharge is considerably greater than when corona discharge is applied on normal water.

The Solution, which is the Fifth Water at this stage, is considered to be formed by monomolecules and be water (solution) containing active $H_2O_2$ (hydrogen peroxide) and active oxygen. That is, the Solution is considered to contain hydrogen peroxide and active oxygen and have no cluster. It has strong sterilizing and disinfecting powers, and is thus effective for various cleansing operations.

The following tests were conducted to investigate the sterilization effect of the Solution (the Fifth Water) produced in this manner.

The germs used in these tests is colon *bacillus*, methicillin-resistant *Staphylococcus aureus*, and *Helicobacter pylori* and *Staphylococcus epidermidis*. A solution (hereinafter referred to as "Test germ solution") adjusted by dissolving one of them in physiological saline solution such that a germ density is $10^7$ units/ml were used in the tests. Also, the Solution (the Fifth Water) was diluted by using 0.9% physiological saline solution to create a 4 ppm solution of the Solution (the Fifth Water) for using it as a disinfectant solution for the test (hereinafter referred to as the "Disinfectant solution").

The test method includes firstly preparing 5 ml of the Disinfectant solution and adding 1 ml of one of the Test germ solutions to the Disinfectant solution. Thereafter, 100 micro liters of the solution is collected after 10 seconds, 60 seconds and five minute, respectively. After collecting the solutions, 900 micro liters of 0.5% sodium thiosulfate is added to the solutions to neutralize the effects of the Disinfectant solution. Then, 100 micro liters of the neutralized solution is collected, and sprinkled on agar culture media to cultivate for one day (in case of the *helicobacter pylori*, for One week). The number of colonies on the culture media is counted, and used as the sterilization effect of the Solution.

As for the Solution's effect on protein, the following test is conducted.

First, 100 micro liters of albumin is prepared. Next, each of the Disinfectant solutions is collected in 4.9 ml, and albumin is added to each of them. Later, 100 micro liters of the solution is collected after 10 seconds, 60 seconds and five minute, respectively. After collecting the solutions, 900 micro liters of 0.5% sodium thiosulfate is added to the solutions to neutralize the effects of the Disinfectant solution. Then, 100 micro liters of the neutralized solution is collected, and sprinkled on agar culture media to cultivate for one day. After the cultivation, the effect of the Solution (the Fifth Water) is measured by the time it takes to completely decompose the protein.

As a result of the above-mentioned, no colonies were observed in the cultures media of all Test germ solutions collected after 10 seconds following the addition of the Test germ solutions to the Disinfectant solution. Also, the proteins were dissolved and none were detected. That is, when 4 ppm of the physiological saline solution of the Solution (the Fifth Water) is used, all respective germs in the Test germ solutions and protein were exterminated, showing that the water does have sterilizing and cleansing power. Therefore, the Solution (the Fifth Water) has extremely strong sterilizing and cleansing power, even with a solution of only 4 ppm.

As shown in FIG. 7, it is considered that the water processed by the cathode 19 of the electric field applying section 5 shows an increased volume of active hydrogen because it can be assumed that the Fourth Water of the previous stage is pure water composed only of such active species as $OH^-$, $H^+$, .H (active hydrogen). Therefore, it is believed that the water (solution) contains more short-lived active species of active hydrogen or radicals than the Third Water and the Fourth water. That is, the water is believed effective in enhancing the resuscitative powers of living things.

The Embodiment 2

Next, the configuration of the second embodiment of the free radical solution producing apparatus according to the present invention will be described in detail with reference to FIGS. 3 to 7 and FIGS. 8 and 9.

Figure 8:
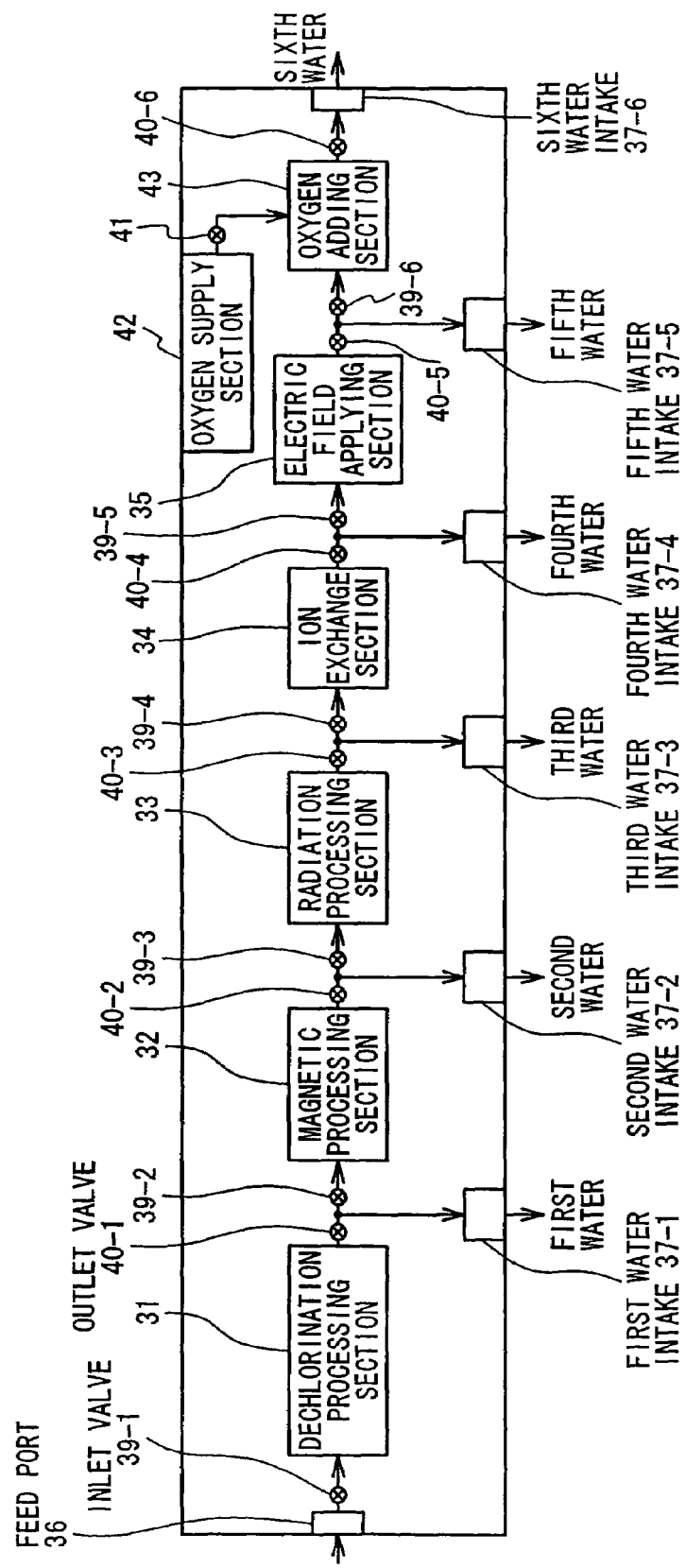
FIG. 8 is a configuration diagram showing the second embodiment of the free radical solution producing apparatus of the present invention.

FIG. 8 is a configuration diagram showing the second embodiment of the free radical solution producing apparatus of the present invention. The free radical solution producing apparatus 38 includes a dechlorination processing section 31, a magnetic processing section 32, a radiation processing section 33, an ion exchange section 34, an electric field applying section 35, an oxygen adding section 43, a feed port 36, first to sixth water intakes 37-1 to 37-6, inlet valves 39-1 to 39-6, and outlet valves 40-1 to 40-6.

This embodiment differs from the first embodiment where it has the sixth process of adding oxygen to the free radical solution of the embodiment 1. By adding oxygen, the movement of oxygen is activated within the Solution (in the embodiment 2, the Free radical solution after oxygen is added shall be called "the Solution"). By it, the Solution can be improved in its cleansing power, sterilizing power and resuscitating power.

Water such as city water is drawn into the apparatus through the feed port 36, the dechlorination process (31)— the magnetic process (32)—the radiation process (33)—the ion exchange process (34)—the electric field application process (35)—the oxygen adding section (36) are implemented in this order, and the product is taken out as the Solution from the sixth water intake 37-6.

In the free radical solution production apparatus 38, the dechlorination processing section 31, magnetic processing section 32, radiation processing section 33, ion exchange section 34, electrical field applying section 35, feed port 36, first to fifth water intakes 37-1 to 37-5, inlet valves 39-1 to 39-5, outlet valves 40-1 to 40-5 are the same as the dechlorination processing section 1, magnetic processing section 2, radiation processing section 3, ion exchange section 4, electrical field applying section 5, feed port 6, first to fifth water intakes 7-1 to 7-5, inlet valves 9-1 to 9-5 and output valves 10-1 to 10-5 of the embodiment 1, respectively. Therefore, the explanation will be omitted.

Figure 9:
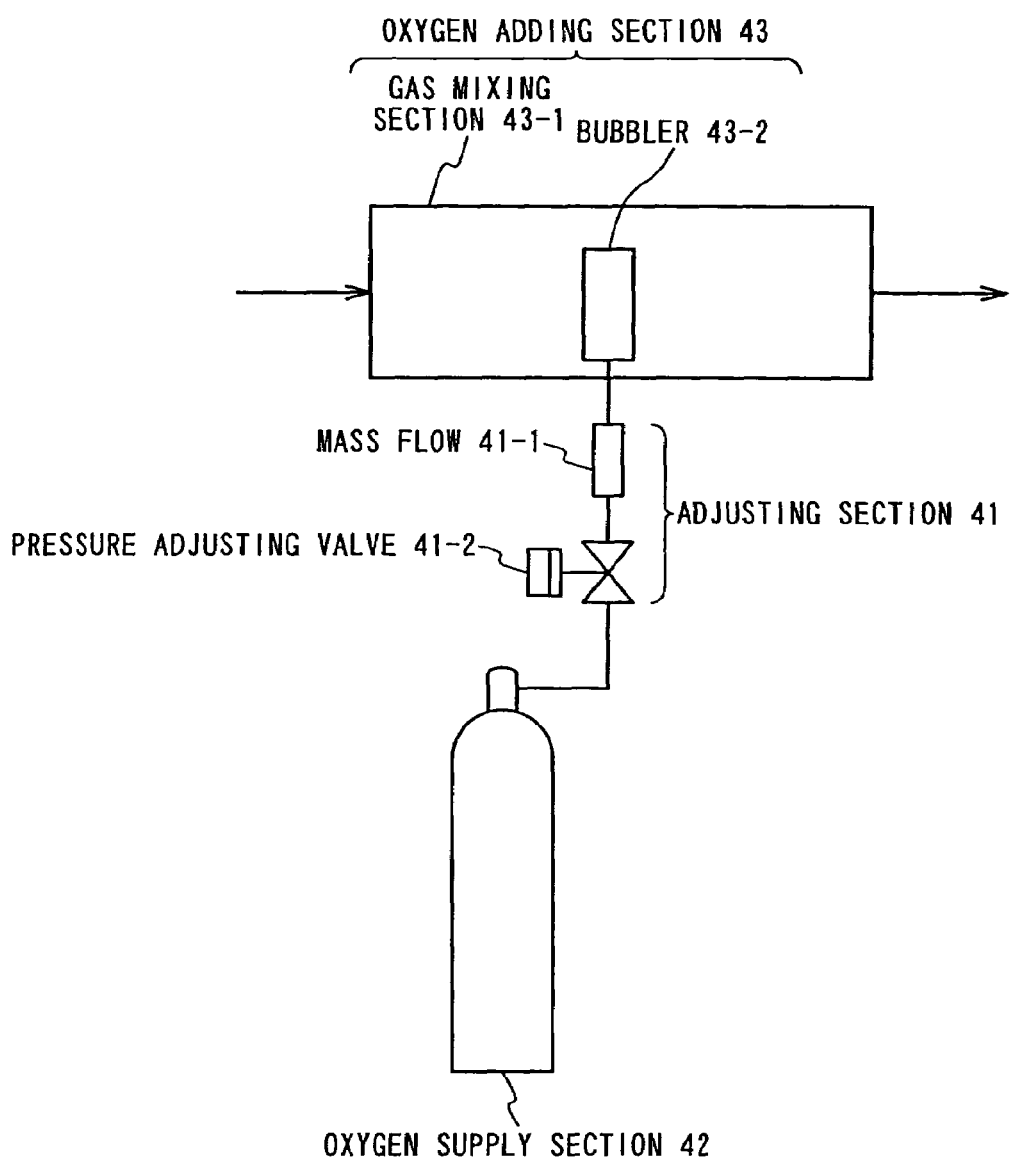
FIG. 9 is a configuration diagram showing the oxygen adding section in the free radical solution producing apparatus of the present invention.

The oxygen adding section 43 is connected by pipe to the electric field applying section 35, through the outlet valve 40-5 and inlet valve 39-6. As shown in FIG. 9, it includes a gas mixing section 43-1 and a bubbler 43-2.

The bubbler 43-2 creates numerous tiny bubbles with the gas sent from the oxygen supply section 42 through the adjusting section 41 and spouts out the foam in the gas mixing section 43-1. The size of bubbles can be adjusted by the pressure and flow rate of the gas. If necessary, a valve to prevent reverse flow is attached to the adjusting section 41.

The gas mixing section 43-1 is a vessel type chamber for mixing and adding oxygen to the Fifth Water. In this embodiment, the vessel is a cylindrical shaped container or a rectangular parallelepiped vessel with a diameter larger than that of the pipe. The Fifth Water flows into and almost fills up the vessel. And oxygen is added to the Fifth Water from the oxygen foam supplied by the bubbler 43-2.

The adjusting section 41 adjusts the pressure of oxygen gas supplied from the oxygen supply section 42 and the flow rate. It includes a mass flow 41-1 and a pressure adjusting valve.

The pressure adjusting valve 41-2 is connected to the oxygen supply section 42 and the mass flow 41-1. The pressure adjusting valve 41-2 is a valve for converting the primary high pressure oxygen gas supplied from the oxygen supply section 42 to a low secondary pressure gas (pressure usable by the mass flow 41-1). The primary pressure and secondary pressure can be selected at will by the type of pressure adjusting valve used.

The mass flow 41-1 connects to the pressure adjusting valve 41-2 and the bubbler 43-2. The mass flow 41-1 sends out the required amount of oxygen gas after the gas is adjusted with the pressure adjusting valve 41-2.

The oxygen supply section 42 is connected to the adjusting section 41, and supplies oxygen to the oxygen adding section 43 through the adjusting section 41. For example, the gas is high purity oxygen or utility oxygen for the facility where the free radical solution production apparatus 38 is installed. In this embodiment, the high purity oxygen gas cylinder (purity of 98%) for medical purposes is used.

The feed port 36 is the inlet valve to draw in water from city water source located outside of the apparatus. It is possible to attach various types of couplers to facilitate pipes connection. The first water intake 37-1 to the fifth water intake 37-5 are the valves for collecting the First Water to the Fifth Water explained in the embodiment 1. Also, the sixth water intake 37-6 is the valve for collecting water (hereafter referred to as "the Sixth Water") processed by oxygen adding section 43. These feed ports and water intakes are operated manually or automatically (electromagnet valves, etc.)

The inlet valves 39-1 to 39-5 and the output valves 40-1 to 40-5 are respectively the inlet and outlet valves for dechlorination processing section 31 to the electric field applying section 35. Also, inlet valve 39-6 and output valve 40-6 are the inlet and output valves for the oxygen adding section 43. These inlet and outlet valves are operated manually or automatically (electromagnet valves, etc).

Next, the operations of the second embodiment of the free radical solution producing apparatus of the present invention will be described below in detail with reference to FIGS. 3 to 7, FIGS. 8 and 9.

In FIG. 8, a city water line is connected to the feed port 36 as the water source. When producing the Solution, it is necessary to open the correct the inlet valves, the outlet valves and water intake by considering which of the First Water to the Sixth Water are necessary. In this embodiment, the Sixth Water shall be collected. Next, the feed port 36 is opened to draw in the water.

The water enters the dechlorination processing section 31. Here, the operations from the dechlorination processing section 31 to the electric field applying section 35 is the same as embodiment 1, so an explanation will be omitted.

Also, the Water (the fifth Water) flowing out from electric field applying section 35 can be collected, if necessary, from the fifth water intake 37-5.

The Water (the Fifth Water No. 5) flowing out of electric field applying section 35 enters the oxygen adding section 43.

At the stage of the Fifth Water, it is considered that the water (solution) is formed by monomolecular, and includes active $H_2O_2$ (hydrogen peroxide) and active oxygen. In other words, it is believed that this solution contains hydrogen peroxide and active oxygen, without any cluster, and is an effective solution for various cleansing operations because of its sterilizing and disinfecting powers.

As shown in FIG. 9, the high pressure oxygen gas from the oxygen supply section 42 is adjusted to a lower designated pressure by the pressure adjusting valve 41-2. In this embodiment, the pressure is 2 $kg/cm^2$. And, the gas is supplied by the mass flow 41-1 to the bubbler 43-2 of the oxygen adding section 43 at the designated flow rate. In this embodiment, the flow rate is 4~15 L/min. This amount is 20%~75% of the flow of the Fifth Water at the gas mixing section 43-1. This is for supplying the necessary volume of oxygen to the Fifth Water. It is more preferable to have an oxygen mixture of 30% or more.

At the oxygen adding section 43, the Fifth Water flows at a set rate while filling the gas mixing section 43-1. In this embodiment the rate is 20 L/min. And, thin, foam-like oxygen gas is released into the Fifth Water by bubbler 43-2. The size of the bubbles can be adjusted with the pressure of the oxygen gas and the structure of the bubbler 43-2. Oxygen bubble diameter of less than 2 mm is preferable for adding oxygen. This is because oxygen can easily dissolve in because of the high rate of surface area. More preferably, the diameter is less than 1 mm. In this embodiment, the diameter is mainly between 0.1 to 0.5 mm.

The Fifth Water contains large amounts of active hydrogen peroxide and active oxygen, and it is considered that the mutual action between the added oxygen and them is extremely strong. And, because of this effect, it is believed that the oxygen adding section 43 is able to dissolve large amounts of oxygen in the Fifth Water.

That is, it is believed that at this stage, the Solution (the Sixth Water) is water containing extremely large amounts of active hydrogen peroxide, active oxygen, and dissolved oxygen.

FIGS. 10 and 11 show the test results of the chemical characteristics of the Solution prepared in this manner (the free radical solution, the Fifth Water and the Sixth Water).

FIG. 10 is a table showing the test results of the oxidation-reduction potential of the Solution (the free radical solution) of the present invention. It shows the oxidation-reduction potential of the Free radical solution (the Fifth Water) without adding oxygen and the Free radical solution (the Sixth Water) with adding oxygen in condition of 5 L/min.~15 L/min. As comparisons the oxidation-reduction potential of city water and city water with chlorine removed are also listed.

As shown in FIG. 10, the oxidation-reduction potential (ORP) of the Free radical solution shows a high value of more than 995 mV. This value differs greatly from the values of 523 mV and 253 mV respectively for city water and city water with chlorine removed. The reason for this is considered that the Free radical solution contains large amounts of active hydrogen peroxide and active oxygen.

Incidentally, as shown in FIG. 11, the value was 980 mV when oxygen was added at 4 L/min.

Also, with the adding of oxygen the oxidation-reduction potential has grown larger. This is considered because the added oxygen dissolved in the Fifth Water are combined with the radicals such as active hydrogen peroxide and active oxygen, and then, they are further activated. Also, in FIG. 10, the maximum value of oxidation-reduction potential is 1,014 mV, but by increasing the amount of added oxygen, the oxidation-reduction potential can be increase more.

Incidentally, the hydrogen ion density (pH) was measured for the Free radical solution explained in FIG. 10. As a result, the pH that indicates hydrogen ion density was approximately 6.0 for all four types. That is, while the water is slightly acidic, it basically shows a neutral value.

That is, it shows that the Free radical solution is a solution with a high oxidation-reduction potential even though it is neutral.

FIG. 11 shows a table of the results of oxidation-reduction potential explained above and hydrogen ion density. FIG. 11 also shows the measurement results of functional water produced by the conventional technologies and the electrolytic water in addition to those of the Free radical solution. In FIG. 11, as for the sterilizing spray, the sterilizing chemicals are added to water, and as for the strong acid water and strong acid water with hydrochloric acid, strong acids are added to water. Therefore, the only solutions generated from pure water are Free radical solution, sanitary sterilized water and electrolytic hypo-aqueous solution.

In the Free radical solution, impurities have been removed by the five processes (or six processes) explained previously. And the Solution is generated by only using the ingredients of pure water. That is, this is the solution generated only by using pure water by running city water through the Free radical solution producing apparatus. And, as shown in FIG. 11, the Free radical solution has an extremely high oxidation-reduction potential while being close to neutral water. That is, it has extremely unique properties as a solution whose main ingredient is water. This is believed to be caused by the fact that this is water containing extremely large amounts of active hydrogen peroxide and active oxygen and dissolved oxygen, which mutually interact between the radicals.

The following tests were conducted to investigate the sterilization effect of the Free radical solution (the Sixth Water) in this embodiment.

(1) Used Germ

Colon *bacillus* 0157:H7 (hereafter referred to as 0157)

Methicillin-resistant *Staphylococcus* (hereafter referred to as MRSA)

(2) Test Materials and References

[Test materials] The Free radical solution (the Sixth Water)

[Reference sterilizer] Chlorhexidine (Product name (trade name):"Hibiten") 0.05%

Aqueous solution: Used for sterilizing skin and equipment for surgery.

[Reference] Sterilized physiological saline solution (3) Testing Method (i) Cultivating 0157 and MRSA. Then, to generate test germ solutions of 0157 and MRSA, respectively with estimated number of germs of $1.0 \times 10^8$ CFU/ml.

(ii) Generating three types of diluted germ solutions for each germ by diluting the above test germ solutions with sterilized physiological saline solution.

Diluted germ solution A: Diluted $10^{-1}$ times (germ quantity $1 \times 10^{-7}$ CFU/ml), Diluted germ solution B: Diluted $10^{-2}$ times (germ quantity $1 \times 10^{-6}$ CFU/ml), and Diluted germ solution C: Diluted $10^{-3}$ times (germ quantity $1 \times 10^{-5}$ CFU/ml).

(iii) Injecting the respective diluted germ solutions (A to C) of 0.2 ml in sterilized certified test tubes, respectively, each of which size is 27 mm×200 mm.

(iv) Setting above-described sterilized test tubes in the constant temperature oven at 20° C. Injecting the Free radical solution, chlorhexidine 0.05% aqueous solution and sterilized physiological saline solution, 20 ml each, respectively into the difference one of the sterilized test tubes.

(v) Interaction time ($t_A$) shall be 1 minute, 2 minutes, 3 minutes, 5 minutes and 10 minutes.

(vi) Mixing 50 micro liters of the respective aqueous solutions (prepared in (4)) including the respective diluted germ solutions after the passage of the respective interaction time with 450 micro liters of 0.5% solution of sodium thiosulfate in the test tubes and stirring to stop the reaction.

(vii) Carrying out the tenfold serial dilution for the germ solutions processed for the respective time (prepared in (6)) by the sterilized physiological saline solution.

Smearing 0.1 ml of the diluted respective germ solutions onto the heart infusion agar.

(viii) Counting the number of colonies appeared after cultivating the cultures for 18 hours at 37° C.

(4) Test Results

A table of FIG. 12 shows the test results on O157. In the table from the left side, the first row shows the aqueous solution used (the above (2) Test materials and references), the second row shows the dilution stages of test germ solutions (above (3) (ii) Diluted germ solutions), the third row shows the quantity of germs in the diluted germ solutions (above (3) (iii) Germ quantity in the sterilized certified tests; total quantity of germs in 0.2 ml of inoculated germ solutions), the fourth row shows the germs detected in the interaction time (tA) (Measurement results in the above (3) (viii); indicated in terms of the number of germs/ml contained in 20 ml of test solutions).

As shown in the table in FIG. 12, in the Free radical solution, O157 is completely sterilized when the number of inoculated germ is $1.42 \times 10^6$ CFU/ml. Also, even in the case of $1.42 \times 10^7$ CFU/ml, a considerable number of germs have died off. When compared with the same stage of dilution ($10^{-1}$), the Free radical solution has a higher sterilization effect than sterilized physiological saline solution, and close to the effect shown by chlorhexidine. The estimated number of germs killed is $7.1 \times 10^4$ CFU/ml (71,000 germs in 1 ml).

That is, it is confirmed that the Free radical solution has a sterilizing effect on O157. And, it is considered that the water sterilizes less than 100,000 germs per 1 ml within one to two minutes.

A table of FIG. 13 shows the test results on MRSA. The table is examined in the same ways as that for FIG. 12.

As shown in the table in FIG. 13, in the Free radical solution, MRSA is completely sterilized when the number of inoculated germ is $0.85 \times 10^6$ CFU/ml. Also, even in the case of $0.85 \times 10^7$ CFU/ml, the table shows that a considerable number of MRSA germs have died off. When compared with the same stage of dilution ($10^{-1}$), Free radical solution has a higher sterilization effect than sterilized physiological saline solution, and close to the effect shown by chlorhexidine. The estimated number of germs killed is $4.25 \times 10^4$ CFU/ml (42,500 germs in 1 ml).

That is, it is confirmed that the Free radical solution has a sterilizing effect on MRSA. And, it is considered that the water sterilizes less than 100,000 germs per 1 ml within one to two minutes.

A cloth was used to wipe off some animal oil stain (meat juices, etc.) and then hand washed after immersing the cloth in the Free radical solution and also in warm water heated to 40 degree C. to compare the cleansing effect. No detergent was used. As a result, the test showed that the removal of oil stain was considerable more when washed with the Free radical solution than with the 40 degree C. warm water. That is, it was verified that Free radical solution has a strong cleansing effect on oil stains.

Also, when a study was held on the cleansing effect on fat and protein from human skin, it was verified that fat and protein from human skin had dissolved in the Solution. That is, it was verified a cleansing effect on fat and protein.

The Sixth Water in this embodiment further enhances the effects of the Free radical solution by adding oxygen to the Fifth Water. That is, the addition of oxygen further enhances the sterilizing and cleansing effect of the Fifth Water in making the aqueous solution a stronger sterilizing and cleansing solution.

The Sixth Water can be obtained by adding oxygen to the Fifth Water after it is generated with the apparatus in FIG. 2 and using another equipment like shown in FIG. 9.

Moreover, if the Free radical solution is exposed to the atmosphere for long hours or at some level of temperature, the properties of Free radical solution revert back closely to the state of city water. For example, the oxidation-reduction potential of 1,014 mV of the Free radical solution drops to about 900 mV in about two hours. Also, the Free radical solution with oxidation-reduction potential of 999 mV shows a drop in ORP to about 805 mV in about 10 minutes at 33 degrees C.

Therefore, while the Free radical solution has strong sterilization and cleansing power, it becomes close to normal water (city water) when it is allowed to stand in the atmosphere for close to one day. This is probably due to the fact that Free radical solution is made of water and does not contain any special additives. That is, this shows that Free radical solution is easily processed and environmentally friendly.

Also, in this invention, the order of the magnetic process section 2 and the radiation processing section 3 is interchangeable. The position of the ion exchange section 4 is also changeable if it comes after the radiation processing section 3 and comes before the electric field applying section 5. Preferably, it should be in the order of the magnetic processing section 2, the radiation processing section 3 and the ion exchange section 4 as shown in FIG. 2.

Moreover, in this invention, the magnetic process section 2 and the radiation processing section 3 may be omitted. In that case, however, there is a possibility that the sterilizing and cleansing effect of the water will decline.

It is possible, with this invention, to produce water with sterilizing, disinfecting and cleansing power as well as just cleansing power. Also, it is possible with this invention to produce water that contains an abundant amount of active hydrogen peroxide.

CAPABILITY OF EXPLOITATION IN INDUSTRY

The Free radical solution can be used in the medical field to cleanse medical equipment by utilizing its sterilizing and cleansing powers. Also, the water can be used as bath water for hospital patients and for care givers.

In the field of foods, the water has the effect of sterilizing and cleansing the fresh vegetables and the sterilizing and cleansing equipment for treating vegetables. Moreover, the water can be used to sterilize and cleans cooking utensils.

In the plant related field, the water has the effect of removing various bacteria in the soil. Also, it may be used to promote the growth of plants.

What is claimed is:

1. A free radical solution producing apparatus comprising:
   a dechlorination processing section which produces first water by decomposing chlorine compounds in water;
   a magnetic processing section which produces second water by carrying out a process that applies a magnetic field to said first water;
   a radiation processing section which produces third water by carrying out a process that irradiates a far infrared radiation and a radiation to said second water;

an ion exchange section which produces fourth water of which impurities are decreased, by carrying out a process that performs an ion exchange for said third water; and an electric field applying section which produces fifth water having sterilizing power by carrying out a process that applies a strong electric field to said fourth water without adding any salts.

2. The free radical solution producing apparatus according to claim 1, further comprising:

an oxygen adding section which produces sixth water having sterilizing power stronger than that of said fifth water by carrying out a process that adds oxygen to said fifth water.

3. The free radical solution producing apparatus according to claim 1, wherein said electric field applying section comprises:

an electrical discharge section which carries out electrical discharge among a plurality of electrodes of which the whole or the part is sunk in said fourth water.

4. The free radical solution producing apparatus according to claim 1, wherein said magnetic processing section comprises:

a magnetic processing tube in which said first water flows; and a plurality of magnet sections which apply magnetic fields to said first water;

wherein each of said plurality of magnetic sections comprises a plurality of magnets positioned on both sides of the magnetic processing tube, said plurality of magnetic sections are adjacent to each other and face the same side of said magnetic processing tube or said plurality of magnetic sections face each other and sandwich the said magnetic processing tube; and wherein said plurality of magnetic sections direct their respective opposing magnetic poles against said magnetic processing tube.

5. The free radical solution producing apparatus according to claim 1, wherein said radiation processing section comprises:

a mineral ore ceramic layer which comprises materials including particulate or porous radioactive materials such that a radiation is efficiently irradiated to said second water passing through said radiation processing section; and a ceramics container which retains said mineral ore ceramic layer.

6. The free radical solution producing apparatus according to claim 5, wherein said radiation processing section has said mineral ore ceramic layer which further comprises materials including far infrared radioactive materials such that a far infrared radiation is efficiently irradiated to said second water passing through said radiation processing section.

7. The free radical solution producing apparatus according to claim 2, wherein said oxygen adding section comprises a bubbling generator which adds oxygen to said fifth water.

8. A free radical solution producing method comprising the steps of:

producing first water by decomposing chlorine compounds in water;

producing second water by carrying out a process that applies a magnetic field to said first water;

producing third water by carrying out a process that irradiates a far infrared radiation and a radiation to said second water;

producing fourth water of which impurities are decreased by carrying out a process that performs an ion exchange for said third water; and producing fifth water having sterilizing power by carrying out a process that applies a strong electric field to said fourth water without adding any salts.

9. The free radical solution producing method according to claim 8, further comprising the step of:

producing sixth water having sterilizing power stronger than that of said fifth water by carrying out a process that added oxygen to said fifth water.

10. The free radical solution producing method according to claim 8, wherein said step of producing said fifth water comprises the step of:

carrying out electrical discharge among a plurality of electrodes of which the whole or the part is sunk in said fourth water.

11. The free radical solution producing method according to claim 8, wherein said step of producing said second water comprises the step of:

applying magnetic fields with different directions alternately to said first water.

12. The free radical solution producing method according to claim 8, wherein said step of producing said third water comprises the step of:

irradiating said radiation and said far infrared radiation to said second water at the same time by mineral ore with grain diameter of less than 2 mm.

13. The free radical solution producing method according to claim 8, wherein an oxidation-reduction potential of said fifth water is equal to or greater than 980 mV.

14. The free radical solution producing method according to claim 13, wherein pH of said fifth water is approximately 6.

15. The free radical solution producing method according to claim 9, wherein an oxidation-reduction potential of said sixth water is equal to or greater than 980 mV.

16. The free radical solution producing method according to claim 15, wherein pH of said sixth water is approximately 6.

* * * * *